US006650952B1

(12) United States Patent
Garcia et al.

(10) Patent No.: US 6,650,952 B1
(45) Date of Patent: Nov. 18, 2003

(54) SYSTEMS AND METHODS TO ENSURE THAT A THRESHOLD GAME RESULT IS POSSIBLE

(75) Inventors: V. Maximillian Garcia, New Haven, CT (US); Adrian Kunzle, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 273 days.

(21) Appl. No.: 09/843,412

(22) Filed: Apr. 26, 2001

Related U.S. Application Data

(63) Continuation-in-part of application No. 09/686,638, filed on Oct. 11, 2000.

(51) Int. Cl.⁷ .................................................. A63F 9/12
(52) U.S. Cl. .............................. 700/91; 463/9; 463/10; 463/43; 273/153 R; 273/157 R
(58) Field of Search .................... 700/91; 273/118 R, 273/118 D, 121 B, 123 A, 142 R, 142 B; 463/1, 7, 9, 15, 23, 25, 29, 31, 42, 34, 43

(56) References Cited

U.S. PATENT DOCUMENTS

| 5,409,225 | A | * | 4/1995 | Kelly et al. ............... 273/118 A |
| 5,667,438 | A |   | 9/1997 | Rehm |
| 5,679,075 | A | * | 10/1997 | Forrest et al. ................. 463/9 |
| 5,683,082 | A | * | 11/1997 | Takemoto et al. ....... 273/121 B |
| 5,921,864 | A |   | 7/1999 | Walker et al. |
| 6,062,978 | A |   | 5/2000 | Martino et al. |
| 6,174,237 | B1 | * | 1/2001 | Stephenson ................... 463/42 |
| 6,340,159 | B1 | * | 1/2002 | Giangrante ................. 273/272 |
| 6,375,567 | B1 | * | 4/2002 | Acres .......................... 463/25 |
| 6,386,980 | B1 | * | 5/2002 | Nishino et al. ............... 463/43 |

OTHER PUBLICATIONS

Ryan, Michael E., "Golf Software: Looking for a Great Golf Game? One of These Five Titles Should Fill the Bill," PC Magazine (1999).
"Microsoft's 'Links LS 2000' Hole–in–One Sweepstakes Gives User a Chance to Win a Hawaiian Vacation," www-.microsoft.com (Nov. 22, 1999).
"It's All About the Game," www.aboutgolf.com (Aug. 25, 2000).
"Online Games," Golfix (Oct. 10, 2000).
"Linx," Golfix (Oct. 10, 2000).
"Super Hole–in–One 'Traditional V1.2a,'" (1998).
"Tee Up, Cyberduffers!," www.mygolf.com (Oct. 10, 2000).
"Play 3 Holes and Win $10,000!," www.vga2000.com (Oct. 10, 2000).
"Shockwave Golf (Shockwave)," www.gamers.com (2000).
"Detailed Instructions," www.shockwave.com (Oct. 10, 2000).

* cited by examiner

Primary Examiner—Jessica Harrison
Assistant Examiner—Y Cherubin
(74) Attorney, Agent, or Firm—Steven M. Santisi

(57) ABSTRACT

Systems and methods are provided to ensure that a threshold game result is possible. According to one embodiment, a game condition associated with a game of skill is established. The game of skill may be, for example, a puzzle game (e.g., a word puzzle game or a graphical puzzle game) or an arcade-style game. It is determined that at least one set of possible player inputs during game play will produce at least a threshold game result given the established game condition. The threshold game result may be associated with, for example, prizes provided to players based on game results.

4 Claims, 13 Drawing Sheets

| POTENTIAL GAME CONDITION IDENTIFIER 1102 | GAME IDENTIFIER 1104 | POTENTIAL GAME CONDITION 1106 | NUMBER OF TIMES USED 1108 |
|---|---|---|---|
| PGC101_101 | G101 | BOARD_101 | 1 |
| PGC101_102 | G101 | BOARD_102 | 2 |
| PGC201_101 | G201 | B, E, L, L, E, R, E, L, A, X, O, R ... | 1 |
| PGC301_101 | G301 | MAZE_101 | 1 |
| PGC301_102 | G301 | MAZE_102 | 0 |
| PGC301_103 | G301 | MAZE_103 | 0 |

| PLAYER IDENTIFIER 902 | NAME 904 | CONTACT INFORMATION 906 | PAYMENT IDENTIFIER 908 | ACCOUNT BALANCE 910 |
|---|---|---|---|---|
| P1001 | JENNIFER JAMES | 32 GARDEN RD. NEWTOWN, USA | 1234-1234-1234-1234 (CREDIT CARD) | +$20.00 |
| P1002 | MICHAEL SMITH | MSMITH@ISP.COM | 1111-2222-3333-4444 (DEBIT CARD) | -$10.00 |
| P1003 | DAVID STONE | (718) 555-1111 | ABC@PAY.COM | 0 |
| P1004 | SUSAN WHITE | (212) 555 1234 | 1212-1212-1212-1212 (CREDIT CARD) | -$0.10 |
| P1005 | KEVIN DOWNS | 1234.5678.1234.5678 | 123456789 (BANK ACCOUNT) | +$1,000.00 |

FIG. 9

| GAME PLAY IDENTIFIER 1002 | PLAYER IDENTIFIER 1004 | GAME IDENTIFIER 1006 | GAME CONDITION 1008 | GAME RESULT 1010 |
|---|---|---|---|---|
| G101_101 | P1001 | G101 | BOARD_101 | 760 PTS |
| G101_102 | P1002 | G101 | BOARD_102 | 1,250 PTS |
| G201_101 | P1006 | G201 | B, E, L, L, E, R, ... | 425 PTS |
| G301_101 | P1001 | G301 | MAZE_101 | 2 MINUTES 54 SECONDS |
| G402_512 | P6439 | G402 | DRIVING COURSE_512 ITEM LOCATIONS_512 | $5.50 |

FIG. 10

| POTENTIAL GAME CONDITION IDENTIFIER 1102 | GAME IDENTIFIER 1104 | POTENTIAL GAME CONDITION 1106 | NUMBER OF TIMES USED 1108 |
|---|---|---|---|
| PGC101_101 | G101 | BOARD_101 | 1 |
| PGC101_102 | G101 | BOARD_102 | 2 |
| PGC201_101 | G201 | B, E, L, L, E, R, E, L, A, X, O, R ... | 1 |
| PGC301_101 | G301 | MAZE_101 | 1 |
| PGC301_102 | G301 | MAZE_102 | 0 |
| PGC301_103 | G301 | MAZE_103 | 0 |

FIG. 11

SYSTEMS AND METHODS TO ENSURE THAT A THRESHOLD GAME RESULT IS POSSIBLE

CROSS-REFERENCE TO RELATED APPLICATIONS

The present application is a continuation-in-part of U.S. patent application Ser. No. 09/686,638 entitled "SYSTEMS AND METHODS WHEREIN AT LEAST ONE SET OF POSSIBLE PLAYER INPUTS TO A PHYSICS SIMULATION WILL PRODUCE A SUCCESSFUL GAME RESULT" and filed Oct. 11, 2000. The entire content of this application is incorporated herein by reference.

FIELD

The present invention relates to games. In particular, the present invention relates to systems and methods to ensure that a threshold game result is possible.

BACKGROUND

Many players enjoy playing games, such as puzzle games and fast paced arcade-style games (e.g., games in which a player uses skill, such as his or her planning and reflexes, to achieve a goal). In one type of word puzzle game, for example, a player is given a five-by-five "grid" with vertical columns and horizontal rows. A letter is displayed to the player, and the player places the letter into the grid (e.g., using a keyboard and/or a computer mouse). This process is repeated until the player completely fills the grid with letters (i.e., until the player places twenty five letters into the grid). When placing letters into the grid, the player tries to form as many words as possible across the rows and down the columns. The player receives points for each three, four, and five-letter word that he or she creates in the grid (five-letter words being associated with the most points). A "successful" game result may require, for example, that ten five-letter words are created (i.e., a five-letter word is created across every row and down every column).

In addition to word puzzle games, many players enjoy playing graphical puzzle games. In one type of graphical puzzle game, an array of colored icons are displayed to a player. The player then selects one or more of the icons. In some games, a player is only allowed to select an icon if it neighbors at least one other icon of the same color. The selected icon is then removed from the display along with any neighboring icons of the same color, and the player receives points based on the number of icons that are removed (e.g., based on the length of the "chain" of neighboring icons of the same color). The remaining icons are then reconfigured, such as by having the icons move up and to the left to fill-in any holes created when icons were removed. Note that this reconfiguration may cause new patterns to emerge in the puzzle (e.g., an icon may be moved such that it now neighbors an icon of the same color). This process is repeated, for example, until no more icons can be removed, all of the icons have been removed, a predetermined number of moves have been made, and/or a predetermined period of time expires. A successful game result may require, for example, that all of the icons are removed from the display.

Players also enjoy playing arcade-style games. Examples of arcade-style games include maze games, racing games, fighting games, shooting games, and flying games. In a maze game, for example, a player moves about within a two-dimensional or three-dimensional maze (e.g., by moving an icon or other representation associated with the player). The player navigates through the maze in an attempt to achieve one or more goals. For example, the player may need to exit the maze or collect game items located within the maze. The player may need to achieve a goal, for example, within a limited number of moves (or a limited amount of movement) or a predetermined period of time. In this case, a successful game result may require, for example, that ten game items are collected within three minutes.

One way a player can play a game, such as any of the puzzle and arcade games described above, is via a player device. For example, the player may use his or her Personal Computer (PC) to access a remote Web site associated with a game provider.

However, one or more game conditions associated with game play can make it impossible for a player to achieve a successful game result. Consider, for example, the word puzzle game described above. It may be impossible to create a five-letter word across every row and down every column given a particular set of twenty five letters (e.g., a set that includes a large number of "X" and "Z" characters). With respect to the graphical puzzle game described above, it may be impossible for a player to achieve a successful game result by removing all of the icons from the game display given a particular array of colored icons that are initially displayed to the player. Similarly, one or more game conditions associated with game play can make it impossible for a player to achieve a successful game result with respect to the maze game described above. For example, given the configuration of a maze and the location of game items within the maze, it may be impossible for a player to collect ten game items within three minutes.

A player may not be concerned if it is sometimes impossible to produce a successful game result during game play. For example, a player will typically not even be aware that he or she cannot select any input parameters during game play (e.g., to place letters within a grid) that will produce a successful game result. Moreover, players typically view these types of games as entertainment and do not have an expectation that every play will have a chance of producing a successful game result.

Consider, however, a game in which a player is promised that he or she has a chance to win a prize based on a game result. In this case, the player may be very concerned if no set of possible player inputs can produce a successful game result. For example, a player may be told that he or she will win a free movie ticket if ten five-letter words are created in a word puzzle game. It is likely that this player will be upset if he or she learns that, for some games, there is no way to arrange the set of letters to create ten five-letter words. That is, the players may feel that the game is being operated in an unfair manner. This may be especially true if players provide payment in exchange for game play and/or a chance to win a prize.

SUMMARY

To alleviate problems inherent in the prior art, the present invention introduces systems and methods to ensure that a threshold game result is possible.

According to one embodiment, a game condition is established in association with a game of skill to be played by a player, and it is determined that at least one set of possible player inputs during game play will produce at least a threshold game result given the established game condition.

According to another embodiment, it is arranged for a player to provide a fee in exchange for playing a game of skill. A game condition associated with the game of skill is established, and it is determined that at least one set of possible player inputs during game play will produce at least a threshold game result given the established game condition. A player input is then received from a remote player device via a communication network, and a game result is determined based on (i) the received player input and (ii) the established game condition. It may then be arranged for the player to receive a prize based on the game result.

One embodiment of the present invention comprises: means for establishing a game condition associated with a game of skill to be played by a player; and means for determining that at least one set of possible player inputs during game play will produce at least a threshold game result given the established game condition.

Another embodiment comprises: means for arranging for a player to provide a fee in exchange for playing a game of skill; means for establishing a game condition associated with the game of skill; means for determining that at least one set of possible player inputs during game play will produce at least a threshold game result given the established game condition; means for receiving a player input from the remote player device via a communication network; means for determining a game result based on (i) the received player input and (ii) the established game condition; and means for arranging for the player to receive a prize based on the game result.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 9 is a tabular representation of a portion of a player database according to an embodiment of the present invention.

FIG. 10 is a tabular representation of a portion of a game play database according to an embodiment of the present invention.

FIG. 11 is a tabular representation of a portion of a potential game condition database according to an embodiment of the present invention.

DETAILED DESCRIPTION

Embodiments of the present invention are directed to systems and methods to ensure that at least one set of possible player inputs during game play will produce at least a threshold game result given an established game condition. As used herein, the phrase "player inputs" refers to any information provided by a player during game play. A player input may represent, for example, a selection of an icon, a placement of a letter, or a direction of movement.

The phrase "threshold game result" refers to any result associated with a game of skill. A threshold game result may represent, for example, a maximum game result or a game result associated with a prize.

The phrase "game condition" refers to any information associated with game play; A game condition may represent, for example, an initial board of game icons displayed to a player, a set of letters, or a maze configuration along with the location of game items within the maze.

Game System Overview

Figure 1:
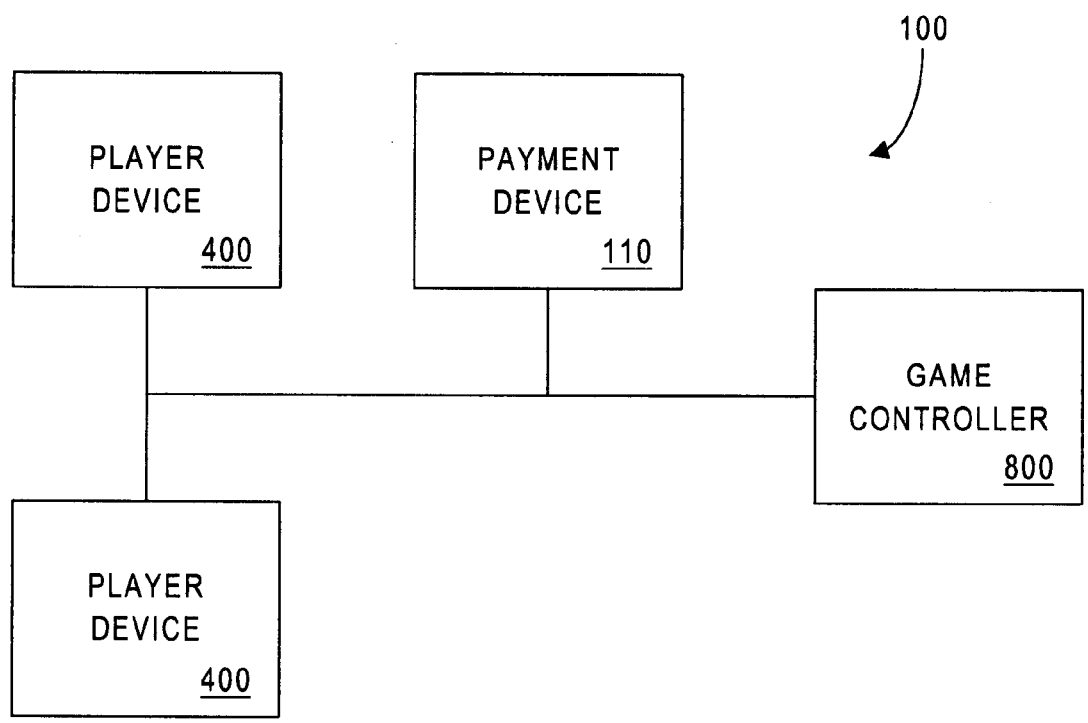
FIG. 1 is a block diagram overview of a game system according to an embodiment of the present invention.

Turning now in detail to the drawings, FIG. 1 is a block diagram of a game system 100 according to one embodiment of the present invention. The game system 100 includes a game controller 800 in communication with a number of remote player devices 400. As used herein, devices (such as the player devices 400 and the game controller 800) may communicate, for example, via a communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a cable television network, or an Internet Protocol (IP) network such as the Internet, an intranet or an extranet. Moreover, as used herein, communications include those enabled by wired or wireless technology. Note that although a single game controller 800 is shown in FIG. 1, any number of game controllers 800 may be included in the game system 100. Similarly, any number of the other devices described herein may be included in the game system 100 according to embodiments of the present invention.

In one embodiment, a player device 400 communicates with a remote, Web-based game controller 800 (e.g., a server) via the Internet. Although some embodiments are described with respect to information exchanged via a game provider's Web site, according to other embodiments information is instead exchanged, for example, via: a telephone, an Interactive Voice Response Unit (IVRU), electronic mail, a WEBTV® interface, a cable network interface, and/or a wireless communication system.

The player device 400 and the game controller 800 may be any devices capable of performing various functions described herein. The player device 400 may be, for example: a PC, a portable computing device such as a Personal Digital Assistant (PDA), a wired or wireless telephone, a one-way or two-way pager, a kiosk (e.g., a game kiosk located at an airport terminal), an interactive television device, a game terminal (e.g., a SONY PLAY STATION® video game terminal), or any other appropriate storage and/or communication device.

Note that the devices shown in FIG. 1 need not be in constant communication. For example, the player device 400 may only communicate with the game controller 800 via the Internet when appropriate (e.g., when attached to a "docking" station or "cradle" coupled to the player's PC). The player device 400 may also communicate with the game controller 800 via an infrared device when near a game kiosk.

A player can use a player device 400 to receive information associated with game play. For example, a player may view a game display via the player device 400. The player device 400 may also be used to provide or generate player inputs during game play. For example, a player may use a keyboard or mouse coupled to his or her PC to select one or more game icons.

Figure 2:
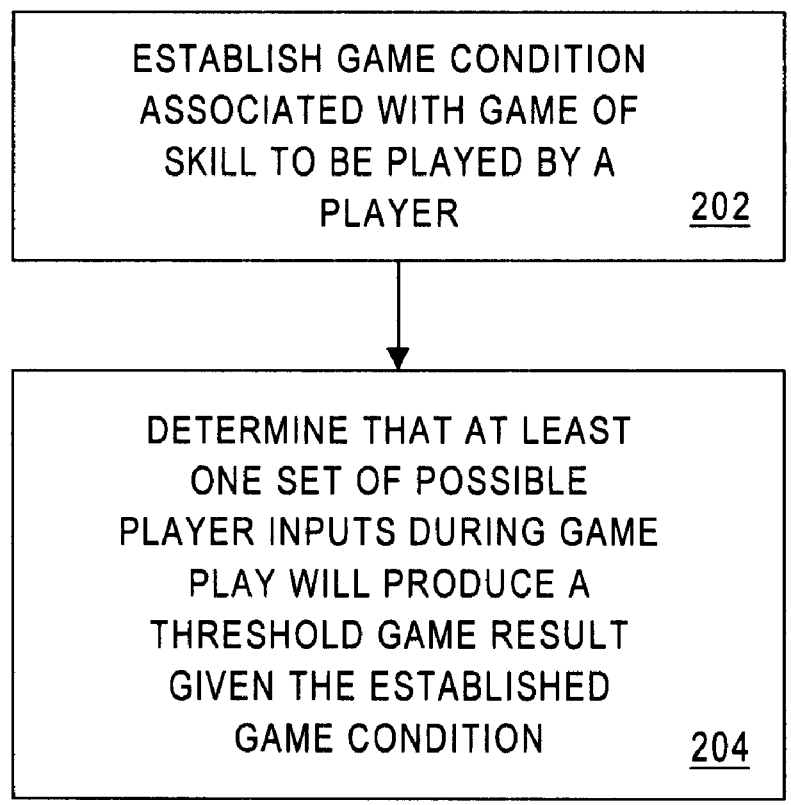
FIG. 2 is a flow chart of a method for facilitating game play according to an embodiment of the present invention.

FIG. 2 is a flow chart of a method for facilitating game play according to an embodiment of the present invention. The flow charts in FIG. 2 and the other figures described herein do not imply a fixed order to the steps, and embodiments of the present invention can be practiced in any order that is practicable. Moreover, the methods may be performed by any of the devices described herein. The method shown in FIG. 2 may be performed, for example, by the game controller 800.

At 202, a game condition associated with a game of skill is established. The game of skill may be, for example, a puzzle game having a number of different potential solutions associated with a range of game results (e.g., as opposed to only a single, "correct" solution as with a cross-word puzzle). By way of example, the puzzle game may be a word puzzle game, in which case the established game condition may be a set of characters associated with the word puzzle game (e.g., a set of letters the player can use to form words or phrases).

The game of skill may instead be a graphical puzzle game, in which case the established game condition may be, for example, a set of game icons (e.g., an initial game board displayed to the player). The game of skill may also be an arcade-style game. In this case, the game condition may be associated with, for example, landscape or terrain information (e.g., a map indicating that certain game areas are lakes), a maze configuration, and/or game item locations. Of course, a single game may be associated with more than one type of game (e.g., the game may include elements of both a word puzzle game and an arcade-style game).

At 204, it is determined that at least one set of possible player inputs during game play will produce at least a threshold game result given the established game condition. That is, given the game condition that was established at 202, it will not be impossible to play the game in a way that will achieve at least the threshold game result.

By way of example, the "game result" may be associated with a score (e.g., a number of points) achieved by the player during game play. The game result may also be associated with a number of game goals achieved by a player (e.g., how many game items a player collected while navigating through a maze). The game result may also be associated with a number of game moves executed by a player or a number of adverse game events that occurred during game play (e.g., how many time a character associated with the player "died" during game play). Other examples of game results include a number of game chances used by a player, an amount of game time, a game status associated with a game character (e.g., the character's "health"), and an accuracy associated with game play.

According to one embodiment, the "threshold" game result is simply a maximum game result (i.e., a "perfect" score). In this case, a player can be told at the start of the game that he or she will be able to achieve a perfect score during game play (assuming that the player provides the correct set of player inputs). According to another embodiment, game play is associated with a range of game results (e.g., scores from 0 to 10,000 points), and the threshold game result is a game result within that range (e.g., a score of 7,500 points).

When prizes are provided to players based on game results, the threshold game result may be associated with a prize. For example, it may be determined that a maximum prize can be won given the established game condition. Similarly, game play may be associated with a range of prizes (e.g., from one dollar to one million dollars), and the threshold game result may be associated with a prize within that range (e.g., five hundred dollars).

According to one embodiment, the game condition is generated in association with a particular game to be played by a player. For example, when a player begins to play the game, the game controller 800 may generate a game condition for that particular game and determine that at least one set of possible player inputs would produce the threshold game result. Consider, for example, a word puzzle game. In this case, the game controller 800 may, select a set of twenty five letters (e.g., the game condition) to be placed by the player into a five-by-five grid. In this case, the game controller 800 may determine that the player would be able to create ten five-letter words given those letters.

According to another embodiment, a plurality of game conditions are generated (e.g., by the game controller 800). For example, the game controller 800 may generate five hundred maze configurations that can be successfully navigated within three minutes (e.g., a player would be able to "exit" the maze within three minutes assuming he or she did not take any wrong turns). In this case, the game controller 800 can retrieve one of the pre-generated maze conditions when a player begins to play a game.

As will be described, the game controller 800 can determine if a set of possible player inputs would produce a threshold game result given the established game condition in a number of different ways. For example, the game controller 800 may generate and evaluate a potential game condition to ensure that at least one set of possible player inputs will produce at least the threshold game result. By way of example, the game controller 800 may "play" the game to determine that a score of 750 out of a possible 1,000 points is possible in a graphical puzzle game given an initial set of game icons (e.g., the potential game condition). According to one embodiment, if the game controller 800 determines that no set of possible player inputs during game play can produce at least the threshold game result, the potential game condition is adjusted (e.g., by straightening a race track in an arcade-style racing game).

According to another embodiment, the game controller 800 generates the game condition in a way that ensures at least one set of possible player inputs will produce at least the threshold game result. Consider, for example, a game such as TETRIS® in which a player attempts to fit together shapes as they are received during game play. In this case, the game controller 800 may divide a block into shapes (e.g., the game condition), and then sequentially provide those shapes to the player during game play. As a result, the threshold game result may be possible if the player happens to position those shapes in the "correct" locations (e.g., to form the block). Of course, the player may still be able to achieve a range of game results (including, perhaps, game results above the threshold game result) by positioning the shapes in other ways.

According to still another embodiment, the game controller 800 generates a first game condition and then generates a second game condition, based on the first game condition, to ensure that at least one set of possible player inputs will produce at least the threshold game result. For example, the game controller 800 may generate a maze configuration (i.e., the first game condition). Based on the maze configuration, the game controller 800 may place game items within the maze (i.e., the second game condition) in such a way that ten of those game items (i.e., the threshold game result) can be collected within sixty seconds.

According to one embodiment, it is arranged for the player to provide payment in exchange for game play. For example, the game controller 800 may arrange for the player to provide payment via a payment identifier associated with a credit card account, a debit card account, a bank account, and/or a digital payment protocol. The game controller 800 may also arrange for a player to receive a prize (e.g., payment of a prize amount) based on a game result. As shown in FIG. 1, a payment device 110 can be used to arrange for the player to provide or receive payment (e.g., of a monetary amount or an alternate currency amount such as a gift certificate).

EXAMPLES

Figure 3:
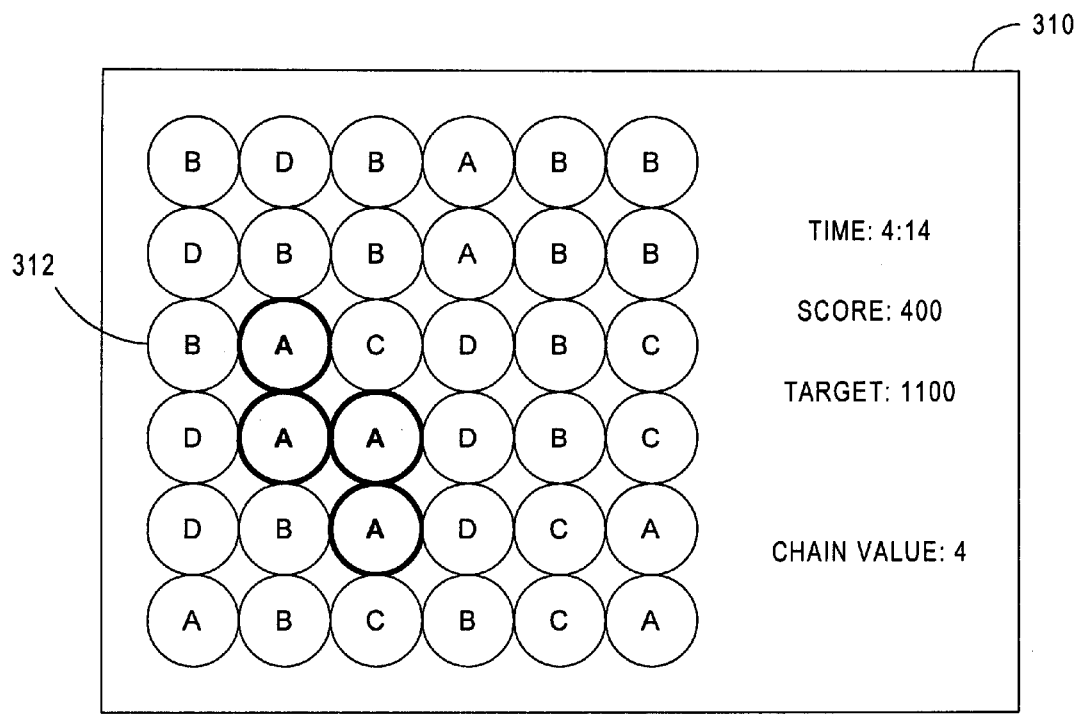
FIG. 3 illustrates game displays according to some embodiments of the present invention.
Figure 3:
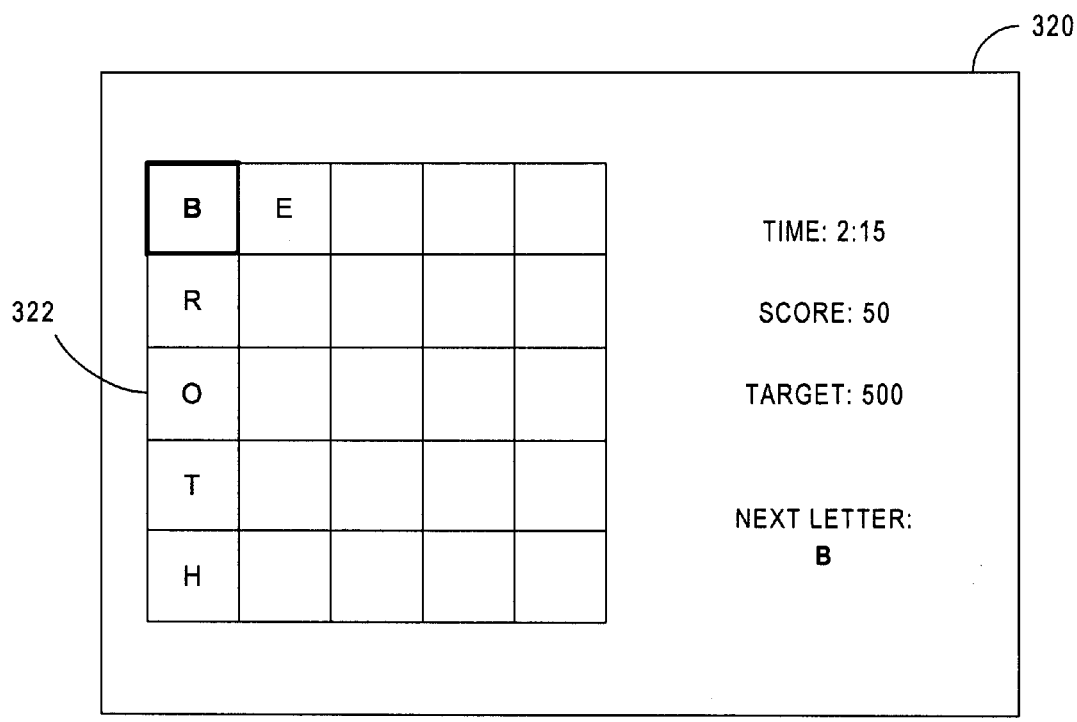

By way of example, consider the first game display 310 shown in FIG. 3 which is associated with a graphical puzzle game. In this example, an array 312 of game icons of different types are displayed to a player (e.g., colored balloons, tiles with symbols, or pictures of famous people), and the player selects one or more icons that neighbor at least one other icon of the same type (e.g., as shown by the bold "A" type icons in FIG. 3). The selected icons are removed from the game display 310, and the player receives points based on the number of icons that are removed (e.g., based on the length of the "chain" of icons). The remaining icons are reconfigured by having the icons move up and to the left to fill-in any holes created when icons were removed. This process is repeated until no more icons can be removed (i.e., no icons neighbor another icon of the same type) or all of the icons have been removed. A successful game result may require, for example, that all of the icons are removed from the display. A successful game result may instead require that a player score at least a predetermined number of points.

According to this embodiment of the present invention, the game controller 800 determines that the array 312 of icons initially displayed to the player could result in a threshold game result (e.g., a target score of 1,100 points required to win a prize or advance to another level of game play) if the player removes particular icons from the array 312 in a particular order. This may be done, for example, by (i) generating a potential array of icons (including the type of each icon) and verifying that at least one sequence of possible player selections will result in the threshold game result or (ii) retrieving the array 312 from a database of pre-generated arrays that have already been verified by the game controller 800. During actual game play, the player may, of course, select different icons (and/or select icons in a different order) which will produce a game result that may or may not be above the threshold game result.

The second game display 320 shown in FIG. 3 is associated with a word puzzle game having a grid 322 with five vertical columns and five horizontal rows. A letter is displayed to the player, and the player places the letter into the grid 322. This process is repeated until the player completely fills the grid with letters (i.e., until the player places twenty five letters into the grid 322). When placing letters into the grid, the player tries to form as many words as possible across the rows and down the columns. The player receives points for each three, four, and five-letter word that he or she creates in the grid 322 (five-letter words being associated with the most points). A perfect game result requires that ten five-letter words are created (i.e., a five-letter word is created across every row and down every column).

According to this embodiment of the present invention, the game controller 800 determines that the twenty five letters that will be displayed to the player during game play will produce in a perfect game result if the player places particular letters in particular locations within the grid 322. This may be done, for example, by (i) generating a potential set of twenty five letters and verifying that ten five-letter words can be formed in the grid 322 or (ii) retrieving a set of twenty five letters that have already been verified by the game controller 800. For example, the game controller 800 may retrieve the following set of twenty five letters (i.e., the game condition):

| B | B | L | L | E |
|---|---|---|---|---|
| R | E | L | A | X |
| O | R | A | T | E |
| T | I | M | E | R |
| H | E | A | R | T |

Note that the player can place the letters into other locations in the grid 322, to achieve a game result within in a range of game results.

Some embodiments of the present invention are directed to systems and methods to facilitate a "game of skill." As used herein, the phrase "game of skill" refers to any game in which a game result is determined based predominantly on a player's skill (e.g., as demonstrated by his or her performance) as opposed to chance. Note that the game result may also be based in part on chance (e.g., a randomly generated value).

Player Device

Figure 4:
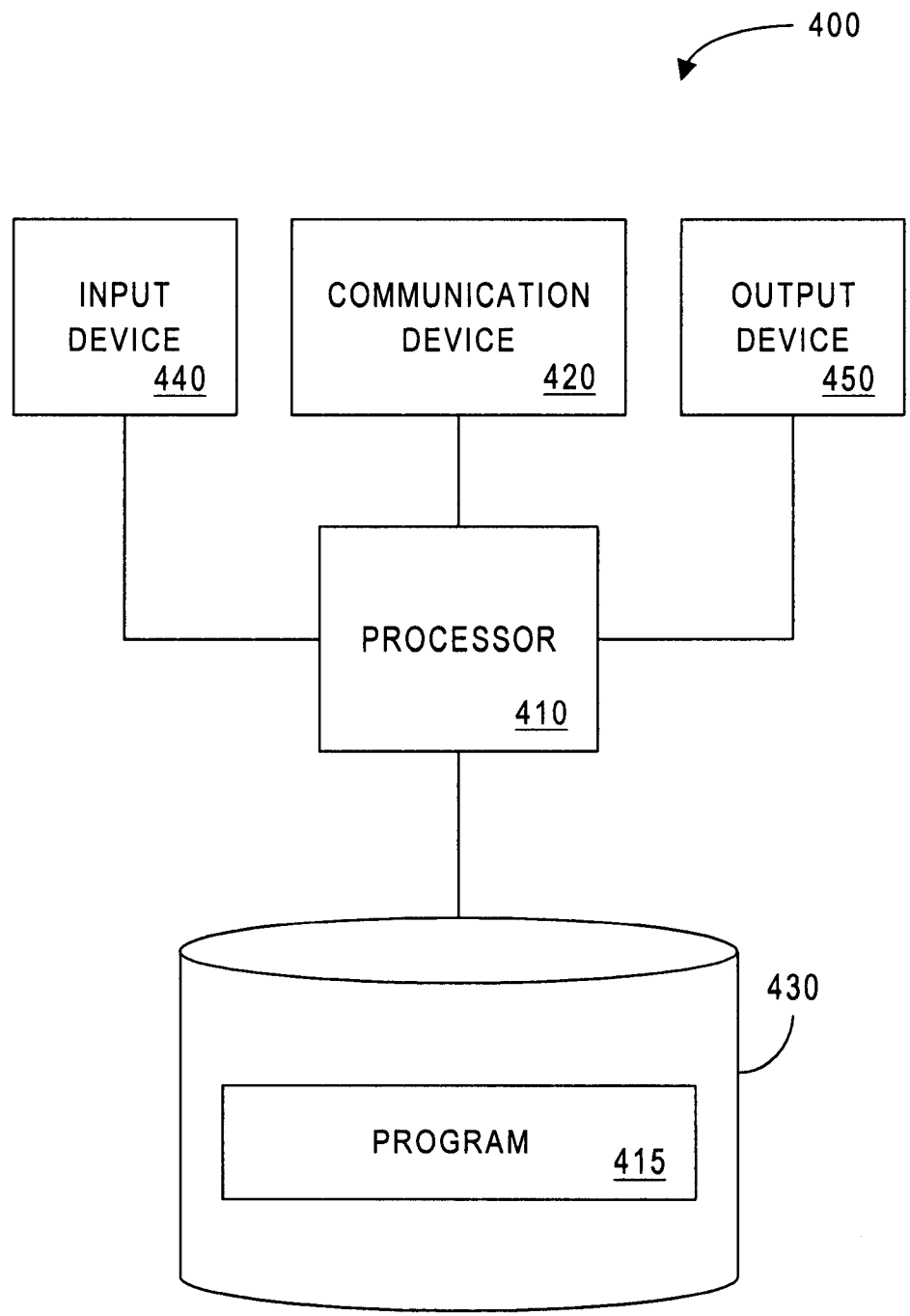
FIG. 4 is a block diagram of a player device according to an embodiment of the present invention.

FIG. 4 illustrates a player device 400 that is descriptive of the device shown in FIG. 1 according to an embodiment of the present invention. The player device 400 comprises a processor 410, such as one or more INTEL® Pentium® processors, coupled to a communication device 420 configured to communicate via a communication network (not shown in FIG. 4). The communication device 420 may be used to communicate, for example, with the game controller 800 and/or the payment device 110.

The processor 410 is also in communication with an input device 440. The input device 440 may comprise, for example, a keyboard, a mouse or other pointing device, a microphone, a knob or a switch (including an electronic representation of a knob or a switch), an infrared port, a docking station, and/or a touch screen. Such an input device 440 may be used, for example, to provide player inputs (e.g., by manipulating a pointer associated with a computer-based puzzle game).

The processor 410 is also in communication with an output device 450. The output device 440 may comprise, for example, a display (e.g., a computer monitor), a speaker, and/or a printer. The output device 450 may be used, for example, to provide game information to a player (e.g., by displaying a game board to the player).

The processor 410 is also in communication with a storage device 430. The storage device 430 may comprise any appropriate information storage device, including combinations of magnetic storage devices (e.g. magnetic tape and hard disk drives), optical storage devices, and/or semiconductor memory devices such as Random Access Memory (RAM) devices and Read Only Memory (ROM) devices.

The storage device 430 stores a program 415 for controlling the processor 410. The processor 410 performs instructions of the program 415, and thereby operates in accordance with the present invention. For example, the processor 410 may arrange for the player to play a game of skill in accordance with a game condition established by the game controller 800.

As used herein, information may be "received" by or "transmitted" to, for example: (i) the player device 400 from the game controller 800; or (ii) a software application or module within the player device 400 from another software application, module, or any other source.

Figure 5:
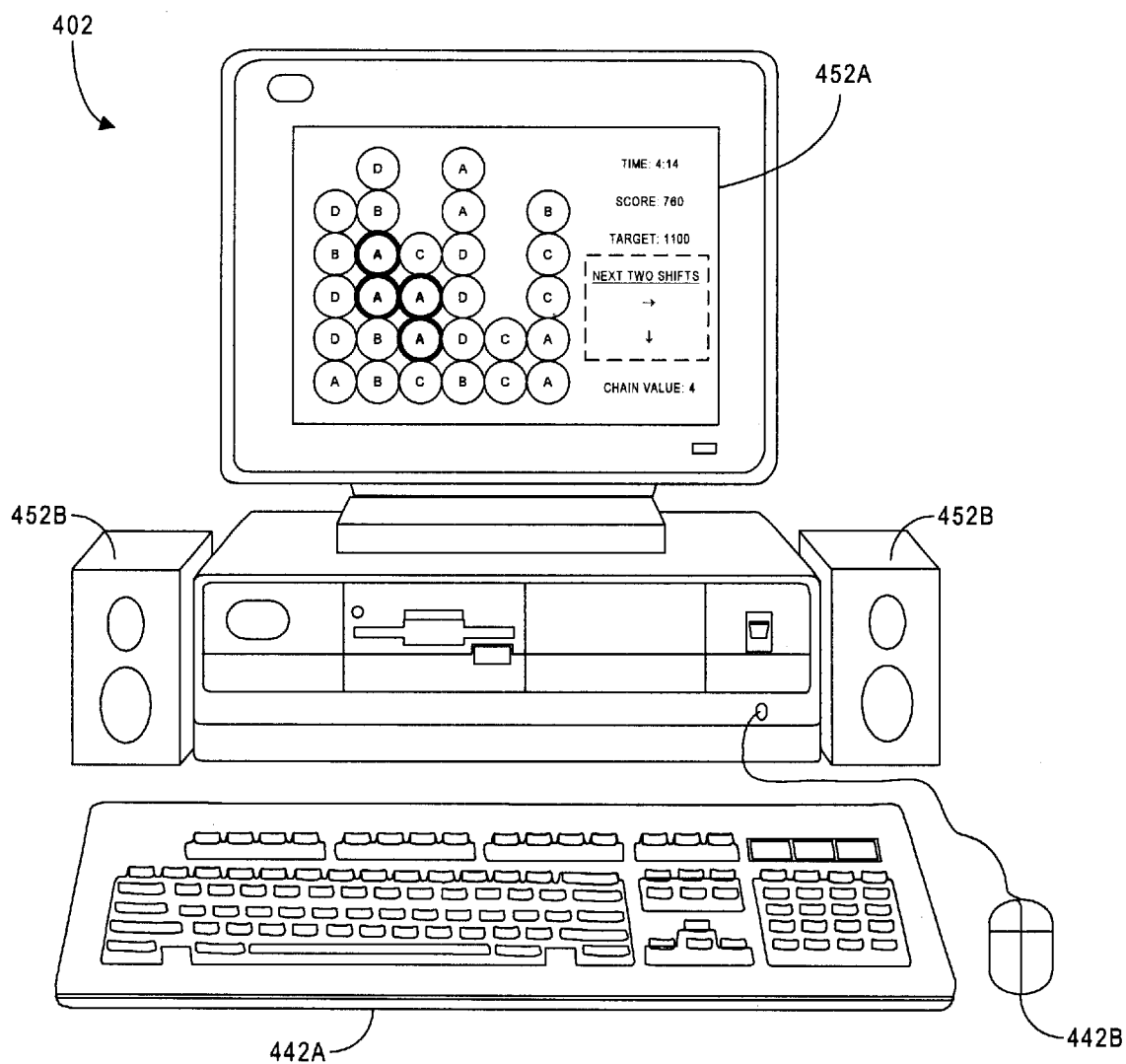
FIGS. 5 through 7 illustrate player devices according to some embodiments of the present invention.

FIG. 5 illustrates a PC 402 displaying a graphical puzzle game according to an embodiment of the present invention. The PC 402 includes a keyboard 442A and a mouse 442B which can be used by a player to provide player inputs (e.g., game icon selections). The PC 402 also includes a computer display 452A and speakers 452B which can be used, for example, to provide a game board to a player.

Figure 6:
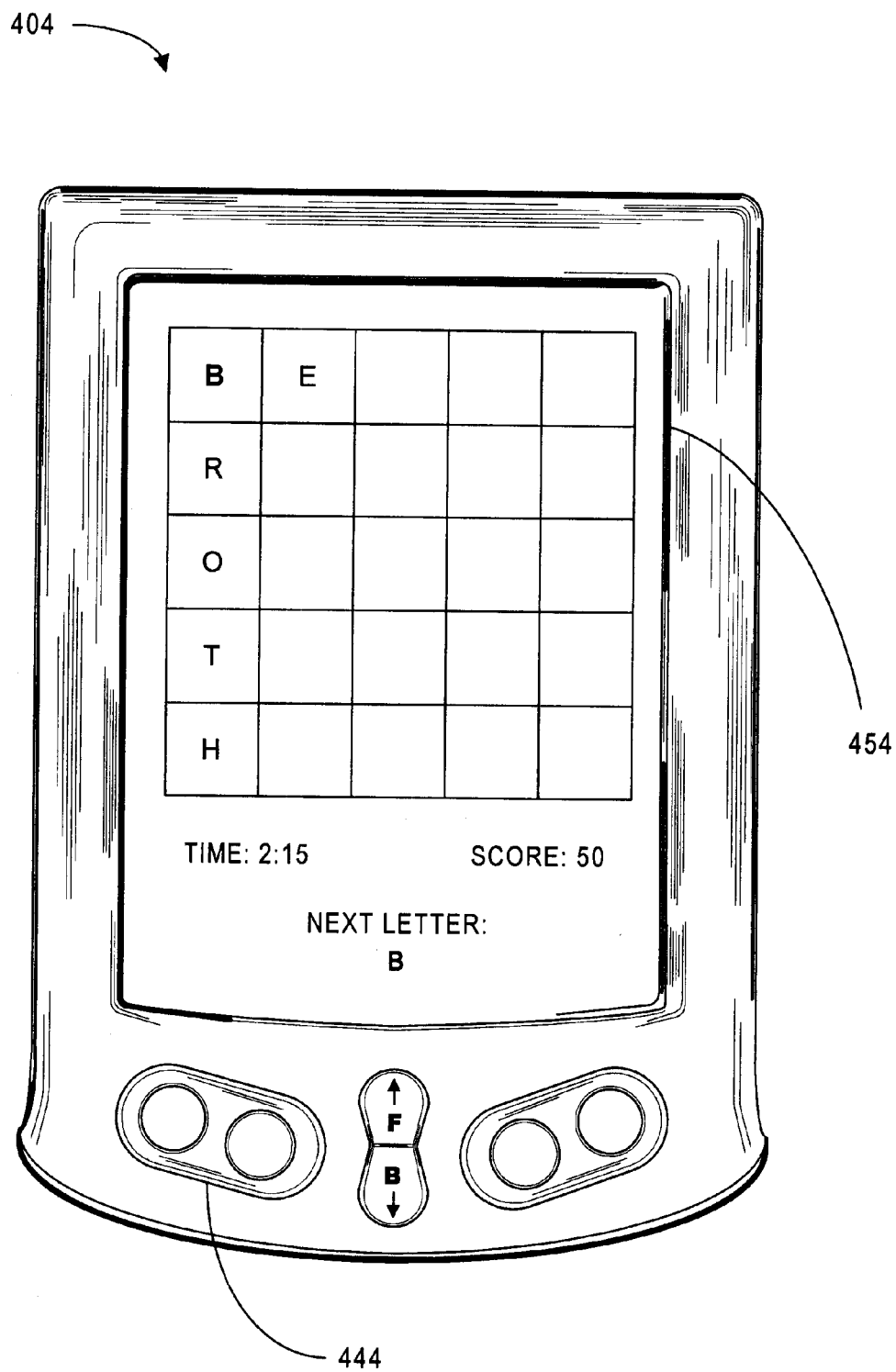

FIG. 6 illustrates a PDA 404 displaying a word puzzle game according to another embodiment of the present invention. The PDA 404 includes an input device 444 and an output device 454 (e.g., a display screen) that may be used by a player during game play.

Figure 7:
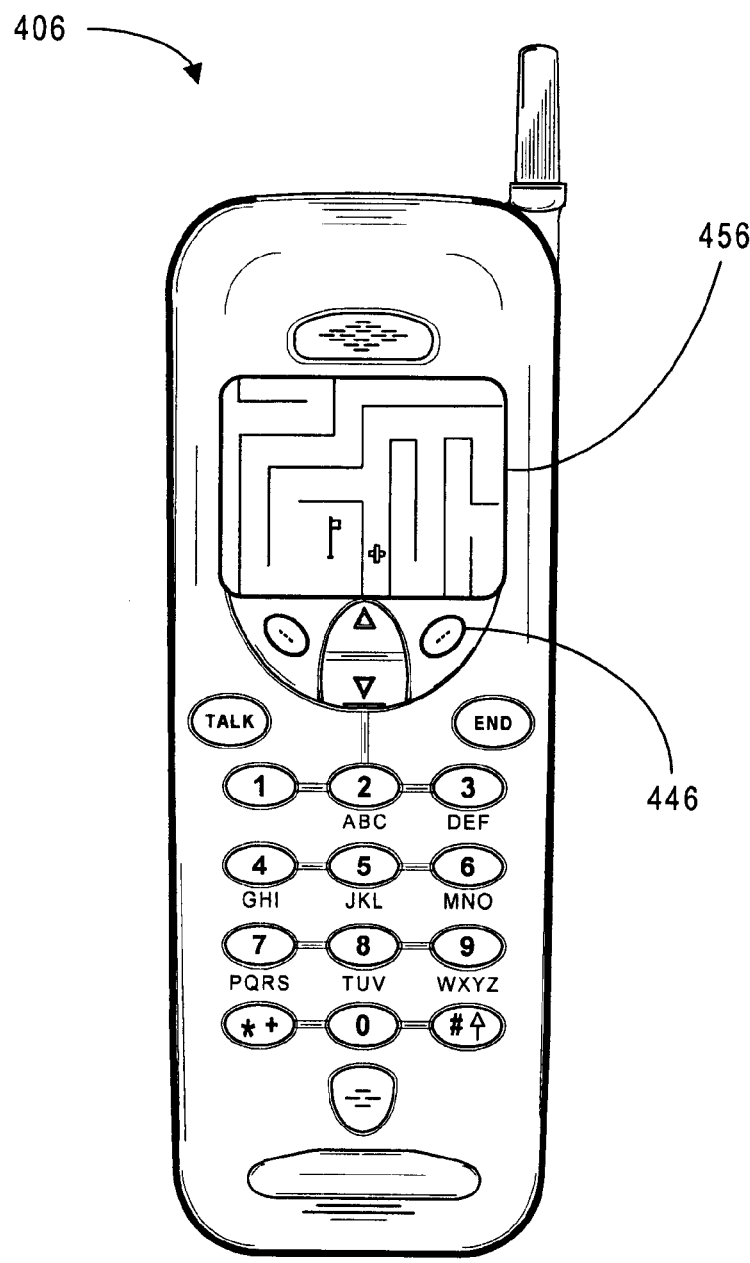

Similarly, FIG. 7 illustrates a wireless telephone 406 including an input device 446 and an output device 456 that may be used to play a game in which a player navigates through a maze and attempts to collect ten game flags within three minutes. According to this embodiment, the game controller 800 determines that the player could collect at least ten game flags within three minutes (i.e., a threshold game result) given the maze configuration and the location of the game flags with in the maze (i.e., an established game condition).

Game Controller

Figure 8:
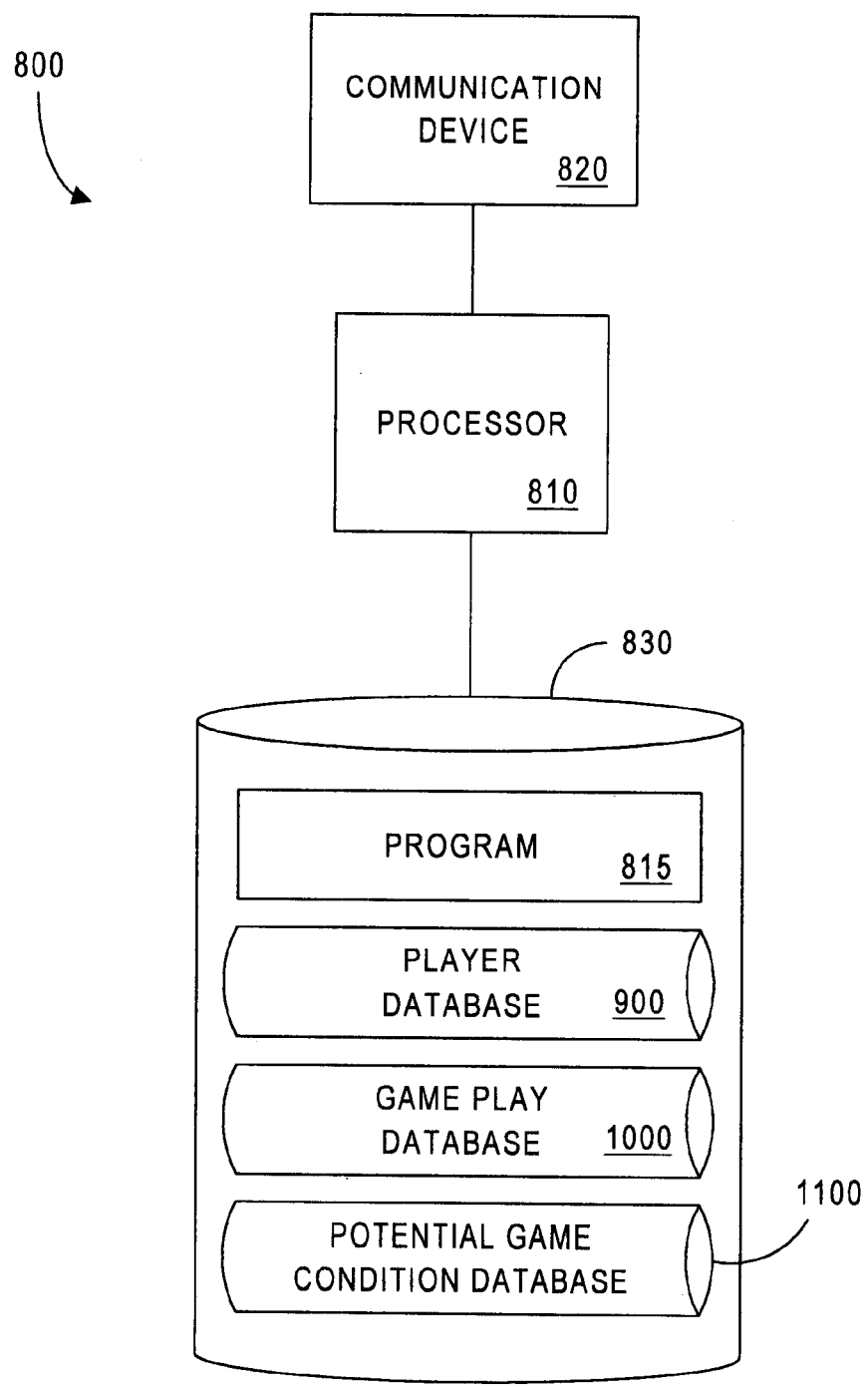
FIG. 8 is a block diagram of a game controller according to an embodiment of the present invention.

FIG. 8 illustrates a game controller 800 that is descriptive of the device shown in FIG. 1 according to an embodiment of the present invention. The game controller 800 comprises a processor 810, such as one or more INTEL® Pentium® processors, coupled to a communication device 820 configured to communicate via a communication network (not-shown in FIG. 8). The communication device 820 may be used to communicate, for example, with one or more player devices 400 and/or the payment device 110.

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as RAM devices and ROM devices.

The storage device 830 stores a program 815 for controlling the processor 810. The processor 810 performs instructions of the program 815, and thereby operates in accordance with the present invention. For example, the processor 810 may establish a game condition associated with a game of skill and determine that at least one set of possible player inputs during game play will produce at least a threshold game result given the established game condition.

According to another embodiment, the processor 810 arranges for a player to provide a fee in exchange for playing a game of skill. The processor 810 establishes a game condition associated with the game of skill and determines that at least one set of possible player inputs during game play will produce at least a threshold game result given the established game condition. The processor 810 receives a player input from a player device 400 via the communication device 820 and determines a game result based on (i) the received player input and (ii) the established game condition. The processor 810 may then arrange for the player to receive a prize based on the game result.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the game controller 800 from the player device 400; or (ii) a software application or module within the game controller 800 from another software application, module, or any other source.

As shown in FIG. 8, the storage device 830 also stores a player database 900 (described with respect to FIG. 9), a game play database 1000 (described with respect to FIG. 10), and a potential game condition database 1100 (described with respect to FIG. 11). Examples of databases that may be used in connection with the game controller 800 will now be described in detail with respect to FIGS. 9 through 11. The illustrations and accompanying descriptions of the databases presented herein are exemplary, and any number of other database arrangements could be employed besides those suggested by the figures.

Player Database

Referring to FIG. 9, a table represents the player database 900 that may be stored at the game controller 800 according to an embodiment of the present invention. The table includes entries identifying players who may play games via the game system 100. The table also defines fields 902, 904, 906, 908, 910 for each of the entries. The fields specify: a player identifier 902, a name 904, contact information 906, a payment identifier 908, and an account balance 910. The information in the player database 900 may be created and updated, for example, based on information received from player when he or she registers with the game controller 800. The information in the player database 900 may also be based on, for example, information generated as the player plays games via the game system 100.

The player identifier 902 may be, for example, an alphanumeric code associated with a player who has registered to use the game system 100. The player identifier 902 may be generated by, for example, the game controller 800 or the player (e.g., when he or she provides a user name and password). The player database 900 also stores the name 904 and contact information 906 (e.g., a postal address, an electronic mail address, an IP address, or a telephone number) associated with each player.

The payment identifier 908 may comprise, for example, a credit card, debit card or bank account number (e.g., a checking account number) or digital payment protocol information. The account balance 910 may represent, for example, an amount that a player owes to a game provider or an amount that the game provider owes to the player. The payment identifier 908 and the account balance 910 may be used, for example, by the game controller 800 to arrange for the player to provide or receive payment (e.g., based on game play).

Game Play Database

Referring to FIG. 10, a table represents the game play database 1000 that may be stored at the game controller 800 according to an embodiment of the present invention. The table includes entries identifying games that are being (or have been) played via the game system 100. The table also defines fields 1002, 1004, 1006, 1008, 1010 for each of the entries. The fields specify: a game play identifier 1002, a player identifier 1004, a game identifier 1006, a game condition 1008, and a game result 1010. The information in the game play database 1000 may be created and updated, for example, as players play games via the game system 100.

The game play identifier 1002 may be, for example, an alphanumeric code associated with a particular game that is being (or has been) played via the game system 100. The player identifier 1004 represents a player who is playing the game and may be based on, or associated with, the player identifier 902 stored in the player database 900. The game identifier 1006 indicates which game is being played (e.g., a word puzzle game, a graphical puzzle game, or an arcade-style game).

The game condition 1008 represents information used during game play. The game condition 1008 may comprise, for example, an array of game icons and game icon types (e.g., "board_101" and "board_102"), a set of letters, or a maze configuration. According to the present invention, the game controller 800 determines that at least a threshold game result is possible given the game condition 1008. The game result 1010 indicates the game result achieved by the player during game play (e.g., a current game result or a final game result). The game result 1010 may be associated with, for example, a score, a number of game goals, a number of game moves, a number of adverse game events, a number of game chances, an amount of game time, a game status associated with a game character, an accuracy, or a prize amount.

Potential Game Condition Database

Referring to FIG. 11, a table represents the potential game condition database 1100 that may be stored at the game controller 800 according to an embodiment of the present invention. The table includes entries associated with game conditions that may be established during game play. The table also defines fields 1102, 1104, 1106, 1108 for each of the entries. The fields specify: a potential game condition identifier 1102, a game identifier 1104, a potential game condition 1106, and a number of times used 1108. The information in potential game condition database 1100 may be created and updated, for example, by a game provider or the game controller 800.

The potential game condition identifier 1102 may be, for example, an alphanumeric code associated with a potential game condition that may be established during game play. The game identifier 1104 indicates a particular type of game (e.g., a word puzzle game, a graphical puzzle game, or an arcade-style game) and may be based on, or associated with, the game identifier 1006 stored in the game play database 1000.

The potential game condition 1106 represents information that may be used during game play (e.g., the information may be retrieved by the game controller 800 and stored as a game condition 1008 in the game play database 1000). The potential game condition 1106 may comprise, for example, an array of game icons and game icon types (e.g., "board_ 101" and "board_102"), a set of letters, or a maze configuration. According to the present invention, the game controller 800 determines that at least a threshold game result is possible given the potential game condition 1106.

The number of times used 1108 indicates how many times the potential game condition 1106 has been used during game play. According to one embodiment, the game controller 800 removes a potential game condition 1006 when the number of times used reaches a pre-determined limit (e.g., to make sure that players do not unfairly anticipate that a frequently used game condition has been established).

Methods that may be used in connection with the game system 100 according to some embodiments of the present invention will now be described in detail with respect to FIGS. 12 and 13.

Game System Methods

Figure 12:
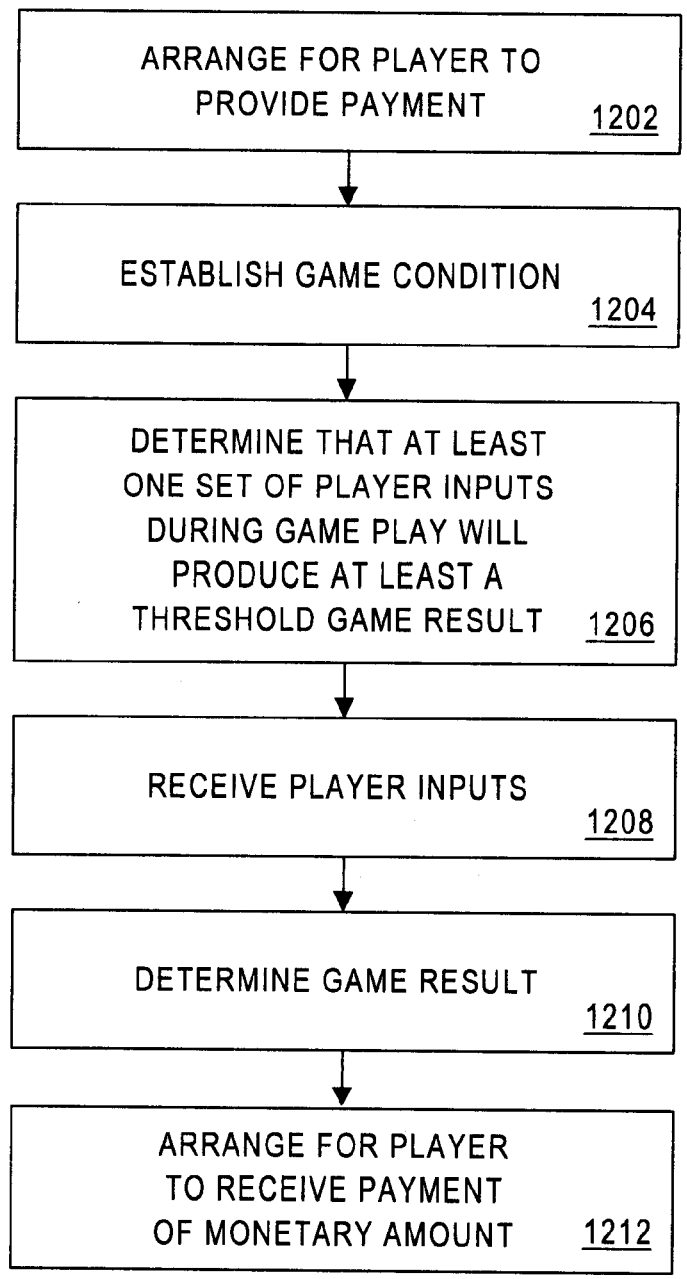
FIG. 12 is a flow chart of a method for facilitating game play according to another embodiment of the present invention.

FIG. 12 is a flow chart of a computer-implemented method for facilitating game play at a game controller 800. At 1202, it is arranged for the player to provide a payment in exchange for playing a game. For example, the game controller 800 may transmit a payment identifier 908 to a payment device 110 to arrange for the player to provide a payment of one dollar in exchange for game play (and the account balance 910 stored in the player database 900 may be updated accordingly).

A game condition associated with the game of skill is established at 1204. For example, the game controller 800 may retrieve a potential game condition 1106 from the potential game condition database 1100 and store the information as a game condition 1008 in the game play database 1000. According to another embodiment, the game controller 800 instead dynamically generates the game condition 1008.

At 1206, it is determined that at least one set of possible player inputs during game play will produce at least a threshold game result (e.g., a "perfect" score or a number of points required to win a prize) given the established game condition. For example, the game controller 800 may have previously verified that every potential game condition 1106 in the potential game condition database 1100 could result in the threshold game result (e.g., assuming a particular set of player inputs during game play). Note that, in this case, step 1206 may have been performed before step 1202.

It is then arranged for the player to play the game of skill in accordance with the established game condition. In particular, the game controller 800 receives one or more player inputs from a player device 400 at 1208. At 1210, a game result is determined by the game controller 800 based on (i) the received player inputs and (ii) the established game condition. For example, the game controller 800 may determine the game result (e.g., a number of points scored by the player during game play) and transmit an indication associated with the game result to the player device 400.

It may then be arranged for the player to receive payment of a monetary amount based on the game result at 1212. For example, a player who achieves a perfect game result in a word puzzle game may win $1,000. The game controller 800 may also update the account balance 910 stored in the player database 900 accordingly.

Figure 13:
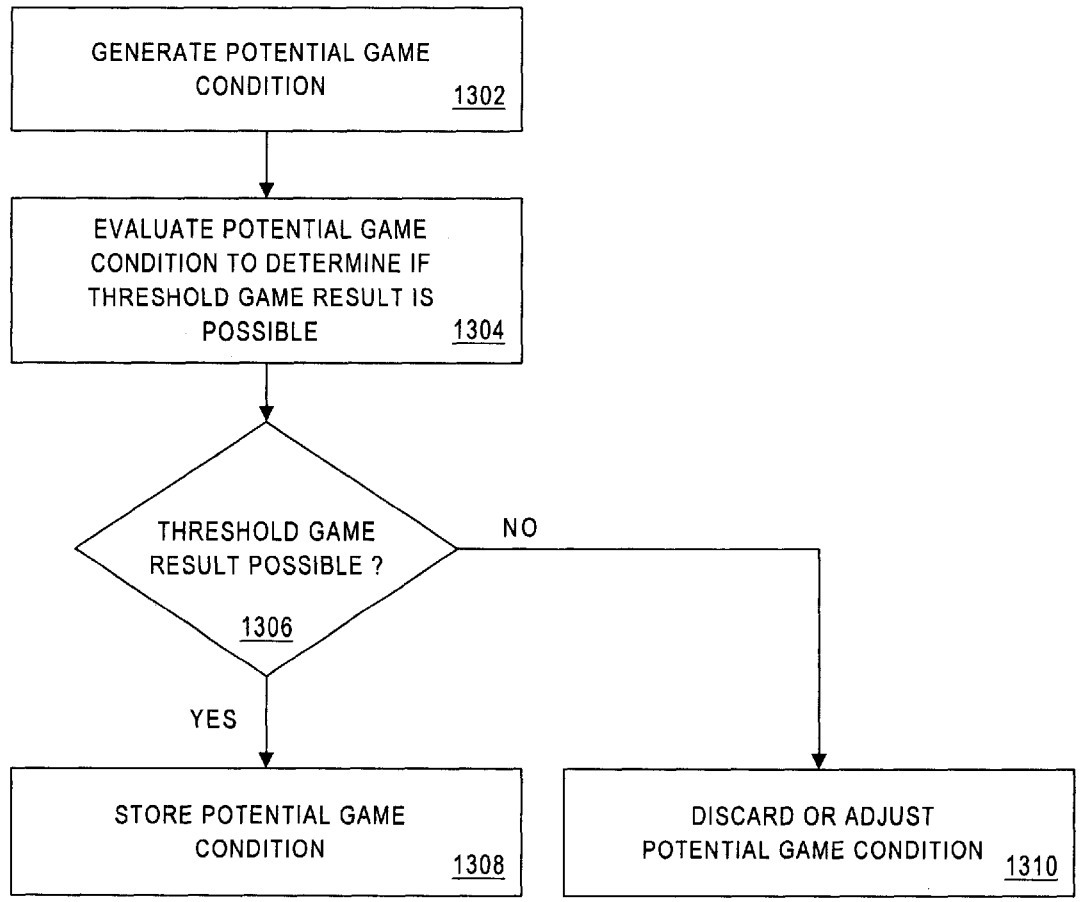
FIG. 13 is a flow chart of a method that may be used to ensure that a threshold game result is possible with respect to a game condition according to one embodiment of the present invention.

FIG. 13 is a flow chart of a method that may be used to ensure that a threshold game result is possible with respect to a game condition. At 1302, a potential game condition is generated according to one embodiment of the present invention. For example, the game controller 800 may randomly generate a maze configuration associated with an arcade-style game.

At 1304, the potential game condition is evaluated to ensure that at least one set of possible player inputs during game play will produce at least the threshold game result given the potential game condition. For example, the game controller 800 may evaluate a potential maze configuration to ensure that a player could complete the maze within a predetermined period of time (e.g., sixty seconds).

If at least one set of possible player inputs could produce the threshold game result at 1306, the game controller 800 stores the potential game condition 1106 in the potential game condition database 1100. The potential game condition 1106 may then be retrieved and used during game play.

If no set of possible player inputs could produce the threshold game result at 1306, the potential game condition is discarded (e.g., by deleting the potential game condition 1106 form the potential game condition database 1100) or adjusted (e.g., by removing a wall from the maze configuration) at 1310.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some embodiments of the present invention have been described with respect to a game controller 800 establishing a game condition and/or determining that at least one set of possible player inputs will produce at least a threshold game result, either of these functions may instead be performed by a player device 400.

Similarly, although most of the embodiments described herein are associated with a game played by a single player, the present invention can also be used with respect to games involving multiple players. For example, the first player to finish a maze may receive payment of a prize amount. In addition, embodiments of the present invention may or may not involve players who provide payments in exchange for game play (e.g., a sweepstakes-type prize may be awarded to a player based on a game result).

According to another embodiment, a game condition is associated with one or more game rules applied during game play. Consider, for example, a game in which a player must complete a maze within a predetermined period of time. In this case, the game controller 800 may adjust a maximum speed associated with the player's movement within the maze (i.e., a game rule) to ensure that the player can potentially complete the maze within the pre-determined period of time.

According to another embodiment, a threshold game result is modified to ensure that the threshold game result is possible given a game condition. For example, the game controller 800 may analyze a maze configuration and calculate that the shortest amount of time required to complete the maze is forty-five seconds. In this case, a maximum amount of time provided to the player may be adjusted from forty seconds to fifty seconds. Similarly, the game controller 800 may calculate a maximum potential score with respect to other types of games (e.g., word puzzle games and graphical puzzle games).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating game play, comprising:
   establishing a game condition associated with a game of skill;
   determining that at least one set of possible player inputs during game play will produce at least a threshold game result given the established game condition;
   wherein said determining comprises:
   generating a potential game condition; and
   evaluating the potential game condition to ensure that at least one set of possible player inputs during game play will produce at least the threshold game result given the potential game condition.

2. A method of facilitating game play, comprising:
   establishing a game condition associated with a game of skill;
   determining that at least one set of possible player inputs during game play will produce at least a threshold game result given the established game condition;
   wherein said determining comprises:
   determining that no set of possible player inputs during game play can produce at least the threshold game result given a potential game condition; and
   adjusting the potential game condition.

3. A method of facilitating game play, comprising:
   establishing a game condition associated with a game of skill;
   determining that at least one set of possible player inputs during game play will produce at least a threshold game result given the established game condition;
   wherein said determining comprises:
   generating a first game condition; and
   generating a second game condition based on the first game condition to ensure that at least one set of possible player inputs during game play will produce at least the threshold game result given the first game condition and the second game condition.

4. A method of facilitating game play, comprising:
   establishing a game condition associated with a game of skill;
   determining that at least one set of possible player inputs during game play will produce at least a threshold game result given the established game condition;
   wherein a plurality of game conditions are generated, and further comprising:
   retrieving one of the game conditions in association with a particular game to be played by a player, wherein one of the game conditions retrieved includes a set of characters if the particular game is a word puzzle game; wherein one of the game conditions retrieved includes a set of icons if the particular game is a graphical game; and wherein one of the game conditions retrieved includes at least one of: (i) landscape information, (ii) terrain information; (iii) a maze configuration, and (iv) game item locations if the particular game is an arcade-style game.

* * * * *